United States Patent
Ge et al.

(10) Patent No.: US 10,875,979 B2
(45) Date of Patent: Dec. 29, 2020

(54) FORMATION AND PROPERTIES OF CELLULAR FOAM FIBROUS MATERIAL

(71) Applicants: Changfeng Ge, Pittsford, NY (US); Mark Olles, Hilton, NY (US); Kevin Cosgrove, Rochester, NY (US); Carlos A. Diaz, Rochester, NY (US)

(72) Inventors: Changfeng Ge, Pittsford, NY (US); Mark Olles, Hilton, NY (US); Kevin Cosgrove, Rochester, NY (US); Carlos A. Diaz, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 192 days.

(21) Appl. No.: 16/122,251

(22) Filed: Sep. 5, 2018

(65) Prior Publication Data

US 2019/0071550 A1    Mar. 7, 2019

Related U.S. Application Data

(60) Provisional application No. 62/554,215, filed on Sep. 5, 2017.

(51) Int. Cl.

| | |
|---|---|
| *C08J 9/35* | (2006.01) |
| *C08L 7/02* | (2006.01) |
| *C08L 97/02* | (2006.01) |
| *C08J 9/30* | (2006.01) |
| *C08J 9/00* | (2006.01) |
| *C08J 9/28* | (2006.01) |
| *B29C 44/34* | (2006.01) |
| *C08J 9/12* | (2006.01) |

(52) U.S. Cl.
CPC ............ *C08J 9/35* (2013.01); *B29C 44/3496* (2013.01); *B29C 44/358* (2013.01); *C08J 9/0061* (2013.01); *C08J 9/0085* (2013.01); *C08J 9/122* (2013.01); *C08J 9/28* (2013.01); *C08J 9/30* (2013.01); *C08L 7/02* (2013.01); *C08L 97/02* (2013.01); *C08J 2201/026* (2013.01); *C08J 2201/03* (2013.01); *C08J 2201/0504* (2013.01); *C08J 2203/06* (2013.01); *C08J 2205/06* (2013.01); *C08J 2303/02* (2013.01); *C08J 2307/00* (2013.01); *C08J 2307/02* (2013.01); *C08J 2375/04* (2013.01); *C08J 2389/00* (2013.01); *C08J 2397/02* (2013.01); *C08J 2407/02* (2013.01); *C08J 2497/02* (2013.01); *C08L 2203/14* (2013.01); *C08L 2205/16* (2013.01); *C08L 2312/00* (2013.01)

(58) Field of Classification Search
CPC .. B29C 44/3496; B29C 44/358; C08J 9/0061; C08J 9/0085; C08J 9/122; C08J 9/28; C08J 9/30; C08J 9/35; C08J 2201/026; C08J 2201/03; C08J 2201/0504; C08J 2203/06; C08J 2205/06; C08J 2303/02; C08J 2307/00; C08J 2307/02; C08J 2375/04; C08J 2389/00; C08J 2397/02; C08J 2407/02; C08J 2497/02; C08L 7/02; C08L 97/02; C08L 2203/14; C08L 2205/16; C08L 2312/00
See application file for complete search history.

(56) References Cited

U.S. PATENT DOCUMENTS

| | | | |
|---|---|---|---|
| 3,916,060 | A | 10/1975 | Fish et al. |
| 4,163,824 | A | 8/1979 | Saidla |
| 8,420,707 | B2 | 4/2013 | Chen et al. |
| 9,097,060 | B1 | 8/2015 | Plummer et al. |
| 9,598,529 | B2 | 3/2017 | Langlois et al. |
| 2003/0105176 | A1* | 6/2003 | Haas ................ B32B 5/18 521/79 |
| 2006/0272548 | A1 | 12/2006 | Yoshida et al. |
| 2012/0009420 | A1 | 1/2012 | Pawloski et al. |
| 2016/0194433 | A1* | 7/2016 | Langlois ......... C08G 18/4211 521/170 |
| 2016/0257486 | A1 | 9/2016 | Kuiper et al. |

FOREIGN PATENT DOCUMENTS

| | | |
|---|---|---|
| CN | 104401585 | 11/2014 |
| CN | 105292758 | 11/2015 |
| CN | 105153391 | 12/2015 |
| EP | 1162222 | 12/2001 |
| WO | 2014015224 | 1/2014 |
| WO | 2017084227 | 5/2017 |
| WO | 2018120826 | 7/2018 |

OTHER PUBLICATIONS

Gawryla, et al. "Foam-like materials produced from abundant natural resources". Green Chemistry, Issue 10, 2008.

\* cited by examiner

*Primary Examiner* — John M Cooney

(74) *Attorney, Agent, or Firm* — Bond, Schoeneck & King, PLLC; Joseph Noto

(57) ABSTRACT

A foaming process for converting fibrous material into a cellular foam structure includes mixing fibrous material and a solvent-based binding agent to form a mixture; saturating the mixture with a pressurized gas to form a gas-saturated mixture; expanding the gas-saturated mixture by reducing the pressure of the pressurized gas to form an expanded mixture with voids in the fibrous material; and curing the expanded mixture to set the fibrous material and drive off the solvent to provide a stable network of fibrous material having cushioning properties.

26 Claims, 4 Drawing Sheets

FORMATION AND PROPERTIES OF CELLULAR FOAM FIBROUS MATERIAL

CROSS REFERENCE

This application claims the benefit of the filing date of U.S. Provisional Patent Application Ser. No. 62/554,215, filed Sep. 5, 2017, which is hereby incorporated by reference in its entirety.

FIELD

The present disclosure relates to a process for the formation of a cellular foam fibrous material and in particular, to a cushioning fibrous material produced by such process.

BACKGROUND

Conventional petroleum based foam materials are Expanded Polystyrene (EPS), Expanded Polyethylene (EPE), Expanded Polypropylene (EPP) and Polyurethane (PU). They are formed by introducing gas such as carbon dioxide or nitrogen into the melted polymer in the presence of high pressure, or mixing chemical blowing agents with the polymer for releasing gas in the cell. In both cases, the bubbles grow in the polymer and stabilized and solidified as cell structure. The gas bubbles nucleate in the liquid and grow stage as spheres and later to foam as the bubbles start to interact.

SUMMARY

In accordance with one aspect of the present disclosure, there is provided a foaming process for converting fibrous material into a cellular foam structure, including: mixing fibrous material and a solvent-based binding agent to form a mixture; saturating the mixture with a pressurized gas to form a gas-saturated mixture; expanding the gas-saturated mixture by reducing the pressure of the pressurized gas to form an expanded mixture with voids in the fibrous material; and curing the expanded mixture to set the fibrous material and drive off the solvent to form a cellular foam structure having cushioning properties.

In accordance with another aspect of the present disclosure, there is provided a batch foaming process for converting fibrous material into a cellular foam structure, including: mixing fibrous material and a solvent-based binding agent to form a mixture; placing the mixture into a mold; placing the mold into a pressure vessel, wherein the mold comprises holes that allow the exchange of pressure and solvent between the mixture and the pressure vessel and constrains the expansion of the mixture; pressurizing the pressure vessel to saturate the mixture with an inert gas to form a gas-saturated mixture and foam the mixture in the mold; releasing the pressure in the pressure vessel to create voids in the foamed fibrous material; and curing the foamed fibrous material to preserve the foamed structure and cross-linking the fibers of the fibrous material to provide a stable network of fibrous material having cushioning properties.

In accordance with another aspect of the present disclosure, there is provided a continuous foaming process for converting fibrous material into a cellular foam structure, including: mixing a solvent-based binding agent and fibrous material to form a mixture; feeding the mixture into a screw driven extruder; saturating the mixture in the extruder with high pressure inert gas; extruding the saturated mixture from an exit nozzle of the extruder where the mixture undergoes primary expansion through pressure drop; and transferring the expanded mixture into a vacuum tunnel under controlled temperature where the mixture undergoes secondary expansion, curing and stabilizing of the cellular structure of the foamed product.

In accordance with another aspect of the present disclosure, there is provided a specific process for converting agriculture wastes and other fiber-based biomass directly into a cellular foam structure by a foaming process, wherein the fibrous material is taken as struts and bonded to each other into a cellular foam structure, including: mixing water and fibrous raw material shredded into small sizes as struts of the cell; stirring the water/fiber mixture until the water is absorbed into the lignocellulose raw material and adding binding agents into the mixture; placing the mixture into a mold having holes that allow the exchange of the pressure and water between the mixture and pressure vessel, wherein the mold constrains the expansion of the foam, and yields a net shape of the foam; foaming the mixture in a pressure vessel, wherein the pressure vessel is closed; purging the system to ensure that all the air is removed from the system, the pressure of the system is then brought up to 1500 psi with nitrogen, the system is then left at the pressure level for 30 minutes for saturation (gas sorption), after 30 minutes at 1500 psi, the pressure is vented as quickly as possible to induce cell nucleation; and curing the sample using a vacuum oven to remove any water from the sample, placing the sample in an oven and evacuate the air from the chamber, once the pressure has reached −25 inches Hg, the sample is left in the chamber until water is no longer bubbling out of the sample, wherein a variety of foam structures can be achieved by controlling the gas mixture (nitrogen, carbon dioxide composition), saturation time, and saturation pressure and initial mixture composition.

These and other aspects of the present disclosure will become apparent upon a review of the following detailed description and the claims appended thereto.

DETAILED DESCRIPTION

Figure 1:
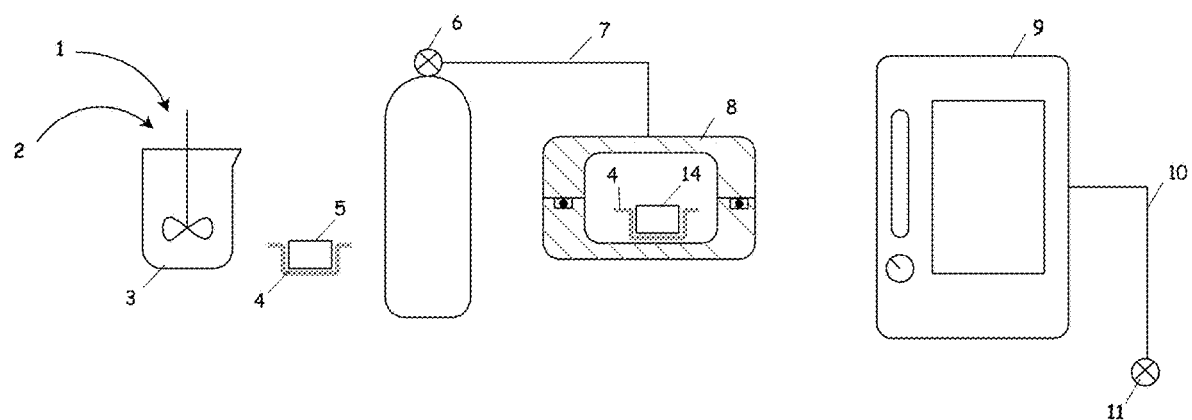
FIG. 1 is a schematic drawing of a batch foaming process in accordance with an embodiment of the present disclosure.

The present disclosure relates to a foaming process for converting fibrous material into a cellular foam structure, including mixing fibrous material and a solvent-based binding agent to form a mixture; saturating the mixture with a pressurized inert gas to form a gas-saturated mixture; expanding the gas-saturated mixture by reducing the pressure of the pressurized inert gas to form an expanded mixture with voids in the fibrous material; and curing the expanded mixture to set the fibrous material and drive off the solvent to provide a stable network of fibrous material having cushioning properties. The process includes a batch process and a continuous process.

Natural or synthetic fibrous material suitable as the structural component of the product has an aspect ratio where the length to diameter ratio is greater than one. The fibrous material can be selected to impart properties such as flexibility or stiffness to the end product. Natural fibrous material can come from various sources such as plant or wood fiber. Synthetic fiber can include materials such as carbon fiber, metal fibers or polymeric fiber.

A binding agent is any material or substance that holds or draws other materials together to form a cohesive mechanically and chemically stable end product through adhesion.

Solvent is a liquid that dissolves the binding agent, such as water and can act as a carrier for the dissolved gas. Suitable solvents include water, methanol, acetone, denatured alcohol, D-limonene, toluene, xylene, dimethyl sulfoxide, and the like.

A solvent-based binding agent is a binding agent that is soluble in the solvent, such as natural rubber, thermal plastic urethane, starch, dextrin, animal glue, casein adhesives, synthetic emulsions, and the like.

A mixture is considered saturated when the combination of the fibrous mixture and solvent-based binding agent contains dissolved gas at or below the solubility limit. The process is considered to have a sufficient amount of gas absorbed into the mixture when the resulting saturated mixture can be depressurized and yield a stable foamed material. The voids are hollow structures in the material where the gas is present.

The primary expansion is through the gas dissolution foaming method, which includes the saturation of the mixture with gas at a given temperature and pressure inside a high-pressure vessel and formation of a single-phase mixture-gas solution. The mixture expansion is achieved by reducing the gas solubility limit in the mixture abruptly, leading to the phase separation of the dissolved gas and promoting the nucleation and growth of the voids. This thermodynamic instability is induced by the quick pressure release or pressure quench.

The secondary expansion involves the application of a controlled reduction in pressure, below atmospheric conditions, on the foam mixture in a vacuum oven or vacuum tunnel. The negative pressure results in a secondary expansion of the mixture. The application can be continuous suction for the expansion or intermittent suction (e.g., cycles of 5 minutes on and 2 minutes off).

The pressure, below atmospheric, and temperature are adjusted to the boiling point of the solvent to drive off the remaining solvent out of the foam, leading to expedited curing of the binding agent. The second expansion is achieved when sufficient drive off of the solvent occurs, indicated when the bubbles of solvent leaving the mixture are no longer visible.

The cushioning properties of the open cell mixture foam are achieved by combination of the air compression, air flow, the local buckling of the struts and global buckling of the mixture foam. The more adherent the binding agent is, the more resilient is the foam structure. The void density determines the degree of air compression and air flow path. The complicated path and a denser void leads to a resilient cushioning. For cushioning a heavy product, more fibers are desired in the first stage of mixing in order to obtain the dense voids in the mixture. The time of gas saturation and the gas dissolving may be adjusted, accordingly. For each void density an optimized processing parameter can be established. In the gas dissolving stage, the time and the pressure alters the cushion density, the degree of cross-linking of the fiber in the binding agent mixture that affects the buckling strength of the fiber. In the curing and second expansion the process continues to alter the void density and cushion properties of the product.

The invention provides value to applications that require single use in packaging or limited term use of foam in the market, including transport protection applications for any products. This would include single use protective packaging for consumer goods like small appliances, electronics, and the like. Protective packaging is a market that considers sustainability a beneficial value proposition as packaging, which traditionally creates unintentional negative perceptions within the consumer. A potentially lucrative future market would be to adapt the foam material to continuous foaming process and create rubber-like resilient cushioning for protecting high value goods. Also, if the fibrous cellular foams were to obtain fire resistant certification, it would likely be able to entering construction and automobile applications to replace polyurethane foam. Products like this include insulation mats and cushion foam for electronic appliances and high value wine and liquors. The invention has the potential to displace petroleum derived foam products for short life cycles such as protective packaging. A strong opportunity exists to produce a technical solution that would allow the material to break down in 2-4 months rather than decades.

An additional advantage of the fiber foams is their potential to be processed on existing thermoplastics manufacturing equipment with modifications. Due to this, complex foam shapes should be able to be molded in much the same way that incumbent polymer foams are. All components of the foam are available in commercial quantity thus meeting demand for these vast markets are plausible. Also, the components and manufacturing process of the fiber foams are low cost. Not only are the fiber foams price competitive, but also they outperform other bio-based and bio-degradable options in the market.

In an embodiment, a batch foaming process for converting fibrous material into a cellular foam structure, includes: mixing fibrous material and a solvent-based binding agent to form a mixture; placing the mixture into a mold; placing the mold into a pressure vessel, wherein the mold includes holes that allow the exchange of pressure and solvent between the mixture and the pressure vessel and constrains the expansion of the mixture; pressurizing the pressure vessel to saturate the mixture with an inert gas to form a gas-saturated mixture and foam the mixture in the mold; releasing the pressure in the pressure vessel to create voids in the foamed fibrous material; and curing the foamed fibrous material to preserve the foamed structure and cross-link the fibers of the fibrous material to provide a stable network of fibrous material having cushioning properties.

FIG. 1 is a schematic sketch of a batch foaming process in accordance with an embodiment of the present disclosure. Solvent-based binding agent 1 and fibrous material 2 are mixed in a mixing device 3. The mixture 5 is poured in a mold 4 and saturated in a high-pressure chamber 8 in an inert gas atmosphere. The pressure in the high-pressure line 7 is regulated through a valve 6. The saturated sample 14 is then primary expanded through quick pressure release and secondary expanded in a vacuum oven 9. The negative pressure in the vacuum line 10 is regulated through a valve 11. Curing and stabilization of the cellular structure occurs in the oven 9.

Compared to conventional foaming processes, the nucleation of this invention occurs without the presence of plastic resin or any sort of resin but only fibrous material, and yet the struts can hold, bond and be cured together for sustaining service stresses. In addition, the mechanical conversion of the agriculture waste is far more cost effective compared to the chemical conversion where the lignocellulose is chemically converted to bio plastics. The mentioned fiber source is available in large commercial quantities where not only involve the plant waste but also the industrial waste, such as wood chip. Agriculture waste needs to be converted in the field and may sometimes require chemicals to be added in order accelerate biodegradation of left over plant matter prior to a new planting cycle. This is particularly problematic in a pineapple plantation as it leads to destruction of soil's ability to support new growth.

In an embodiment, a continuous foaming process for converting fibrous material into a cellular foam structure, includes: the steps of the continuous process included mixing, extrusion under high pressure, primary expansion through pressure drop at the nozzle and secondary expansion in the temperature controlled vacuum tunnel.

Figure 2:
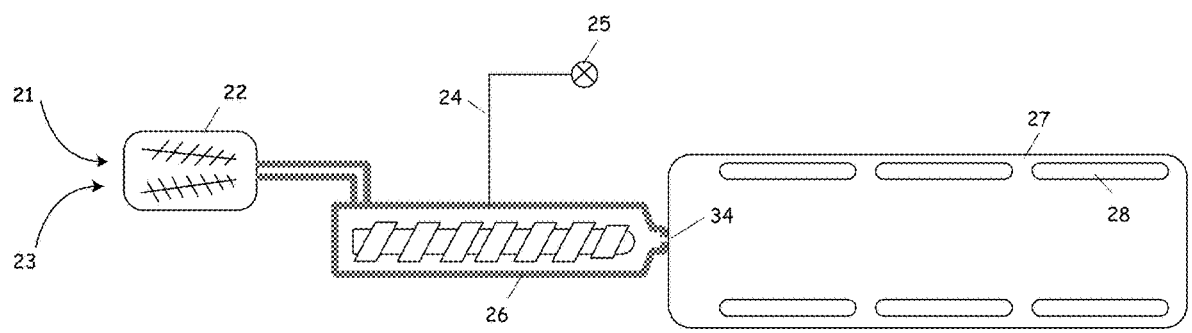
FIG. 2 is a schematic drawing of a continuous foaming process in accordance with an embodiment of the present disclosure.

FIG. 2 is a schematic of a continuous foaming process in accordance with an embodiment of the present disclosure. Mixing of the solvent-based binding agent 21 and the fibrous material 23 is accomplished in a continuous screw driven mixer 22. The mixture is pumped into an extruder 26 where it is saturated with high pressure inert gas. Pressurized inert gas is delivered through a high pressure line 24 and regulated via a high pressure delivery apparatus 25. Expansion occurs at the nozzle 34 through pressure drop. Further expansion occurs in the vacuum tunnel 27 under controlled temperature which allows for curing and stabilization of the cellular structure. Temperature is controlled using heating elements 28.

The disclosure will be further illustrated with reference to the following specific example. It is understood that this example is given by way of illustration and is not meant to limit the disclosure or the claims to follow.

Example 1

In this Example, the empty fruit bunch (EFB) was shredded into small sizes as struts of the cell, and water was then added as the solvent. The agricultural wastes, such as empty fruit bunch (EFB), are mainly composed of lignocellulose, which can be further separated into cellulose, hemicellulose and lignin components. The solvent/EFB mixture was stirred until the solvent was fully absorbed into the fiber. Subsequently, natural latex as binding agents was added into the mixture. The mixture was then placed into a mold, the side walls have holes that allow the exchange of the pressure and solvent between moisture and pressure vessel. The mold constrains the expansion of the foam, and yields a net shape. The gas dissolution foaming process took place in a pressure vessel. The mold was placed at the bottom half of the pressure vessel. When the pressure vessel was closed, the valve on the cylinder containing nitrogen was then opened and the gas purges the system for a period of time to ensure that all the air was removed from the system. The valves on the system were closed and the pressure of the system was then brought up to a high pressure (1500 psi). The vessel was then left at the pressure level for a period of time (30 minutes) for saturation. After 30 minutes at 1500 psi, the connection to the nitrogen tank was closed and the valves were opened in order to vent the pressure as quickly as possible to induce the primary expansion. The curing and second expansion process used a vacuum oven to remove solvent from the sample. The vacuum oven was first preheated to 70° C. as confirmed by external temperature probe. After the temperature has been reached, the sample is placed in the oven and the door is closed. The vacuum pump is turned on and the left to evacuate the air from the chamber. Once the pressure has reached −25 inches Hg the valve between the pump and the system is closed. The sample is left in the chamber until water is no longer bubbling out of the sample (~5 minute).

Figure 3:
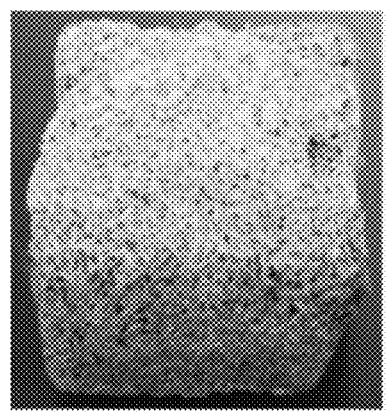
FIG. 3 is a picture of a sample foam produced from the batch process of Example 1 in accordance with an embodiment of the present disclosure.
Figure 4:
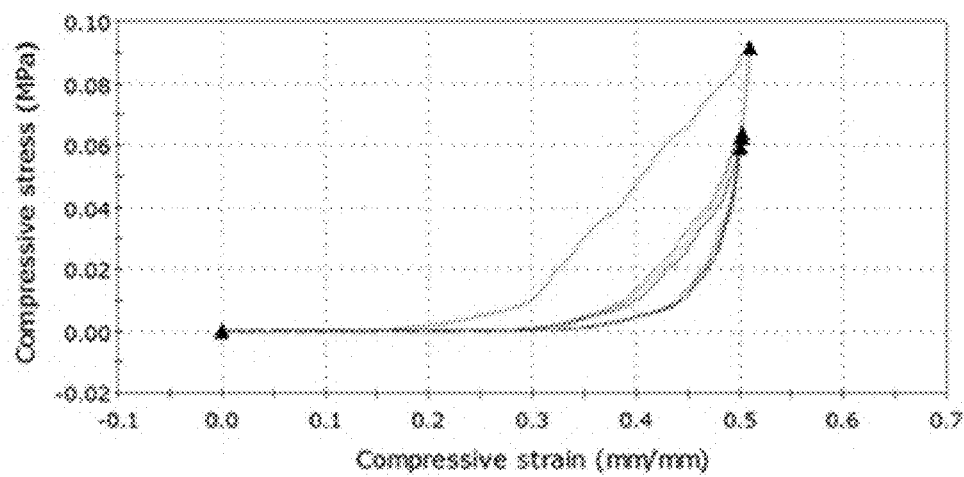
FIG. 4 represents compressive stress-strain curve of the sample foam produced in Example 1 in accordance with an embodiment of the present disclosure.

FIG. 3 is a picture of the sample foam produced from the batch process in Example 1. FIG. 4 is a compressive stress-strain curve of the sample foam. FIG. 4 shows the graphs from five consecutive compression tests for the foam sample. The stress-strain curves show a property of viscoelastic material that combines both viscous and elastic response under loading and unloading. The viscoelastic behavior of a foam material is often manifested in the presence of hysteresis under cyclic loading.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A foaming process for converting fibrous material into a cellular foam structure, comprising:
   mixing fibrous material and a solvent-based binding agent to form a mixture;
   saturating the mixture with a pressurized gas to form a pressurized gas-saturated mixture;
   reducing the pressure of the pressurized gas-saturated mixture to form a first stage expanded mixture with voids in the mixture; and
   forming a second stage expanded mixture by boiling the solvent from the solvent-based binding agent to set the fibrous material and drive off the solvent to form a stable cellular foam structure having cushioning properties.

2. The process of claim 1, wherein the fibrous material comprises natural or synthetic fibrous material.

3. The process of claim 1, wherein the natural fibrous material comprises plant or wood fiber.

4. The process of claim 1, wherein the synthetic fibrous material comprises carbon fiber, metal fiber or polymeric fiber.

5. A foaming process for converting fibrous material into a cellular foam structure, comprising:
   mixing fibrous material and a solvent-based binding agent to form a mixture;
   saturating the mixture with a pressurized gas to form a pressurized gas-saturated mixture;
   expanding the gas-saturated mixture by reducing the pressure of the pressurized gas to form an expanded mixture with voids in the mixture; and
   curing the expanded mixture to set the fibrous material and drive off the solvent to form a stable cellular foam structure having cushioning properties, wherein the solvent comprises water, methanol, acetone, denatured alcohol, D-limonene, toluene, xylene or dimethyl sulfoxide.

6. A foaming process for converting fibrous material into a cellular foam structure, comprising:
   mixing fibrous material and a solvent-based binding agent to form a mixture;
   saturating the mixture with a pressurized gas to form a pressurized gas-saturated mixture;

expanding the gas-saturated mixture by reducing the pressure of the pressurized gas to form an expanded mixture with voids in the mixture; and curing the expanded mixture to set the fibrous material and drive off the solvent to form a stable cellular foam structure having cushioning properties, wherein the binding agent comprises natural rubber, thermal plastic urethane, starch, dextrin, animal glue, casein adhesives or synthetic emulsions.

7. The process of claim 5, wherein the solvent-based binding agent comprises a water-natural latex combination.

8. The process of claim 1, wherein the inert gas comprises nitrogen.

9. A batch foaming process for converting fibrous material into a cellular foam structure, comprising:
   mixing fibrous material and a solvent-based binding agent to form a mixture;
   placing the mixture into a mold;
   placing the mold into a pressure vessel, wherein the mold comprises holes that allow the exchange of pressure and solvent between the mixture and the pressure vessel and constrains the expansion of the mixture;
   pressurizing the pressure vessel to saturate the mixture with an inert gas to form a gas-saturated mixture and foam the mixture in the mold;
   releasing the pressure in the pressure vessel to create voids in the foamed fibrous material; and
   curing the foamed fibrous material to preserve the foamed structure and cross-linking the fibers of the fibrous material to provide a stable network of fibrous material having cushioning properties.

10. A continuous foaming process for converting fibrous material into a cellular foam structure, comprising:
   mixing a solvent-based binding agent and fibrous material to form a mixture;
   feeding the mixture into a screw driven extruder;
   saturating the mixture in the extruder with high pressure inert gas;
   extruding the saturated mixture from an exit nozzle of the extruder where the mixture undergoes primary expansion through pressure drop; and
   transferring the expanded mixture into a vacuum tunnel under controlled temperature where the mixture undergoes secondary expansion, curing and stabilizing of the cellular structure of the foamed product.

11. The process of claim 1, wherein the solvent comprises water, methanol, acetone, denatured alcohol, D-limonene, toluene, xylene or dimethyl sulfoxide.

12. The process of claim 1, wherein the binding agent comprises natural rubber, thermal plastic urethane, starch, dextrin, animal glue, casein adhesives or synthetic emulsions.

13. The process of claim 1, wherein the solvent-based binding agent comprises a water-natural latex combination.

14. The process of claim 1, wherein the second stage expansion is initiated by a vacuum.

15. The process of claim 9, wherein the fibrous material comprises natural or synthetic fibrous material.

16. The process of claim 9, wherein the natural fibrous material comprises plant or wood fiber.

17. The process of claim 9, wherein the synthetic fibrous material comprises carbon fiber, metal fiber or polymeric fiber.

18. The process of claim 9, wherein the solvent comprises water, methanol, acetone, denatured alcohol, D-limonene, toluene, xylene or dimethyl sulfoxide.

19. The process of claim 9, wherein the binding agent comprises natural rubber, thermal plastic urethane, starch, dextrin, animal glue, casein adhesives or synthetic emulsions.

20. The process of claim 9, wherein the solvent-based binding agent comprises a water-natural latex combination.

21. The process of claim 10, wherein the fibrous material comprises natural or synthetic fibrous material.

22. The process of claim 10, wherein the natural fibrous material comprises plant or wood fiber.

23. The process of claim 10, wherein the synthetic fibrous material comprises carbon fiber, metal fiber or polymeric fiber.

24. The process of claim 10, wherein the solvent comprises water, methanol, acetone, denatured alcohol, D-limonene, toluene, xylene or dimethyl sulfoxide.

25. The process of claim 10, wherein the binding agent comprises natural rubber, thermal plastic urethane, starch, dextrin, animal glue, casein adhesives or synthetic emulsions.

26. The process of claim 10, wherein the solvent-based binding agent comprises a water-natural latex combination.

* * * * *